July 2, 1935.    G. B. STAPLES    2,007,113
HIGH PRESSURE GREASING APPARATUS
Filed Jan. 26, 1931
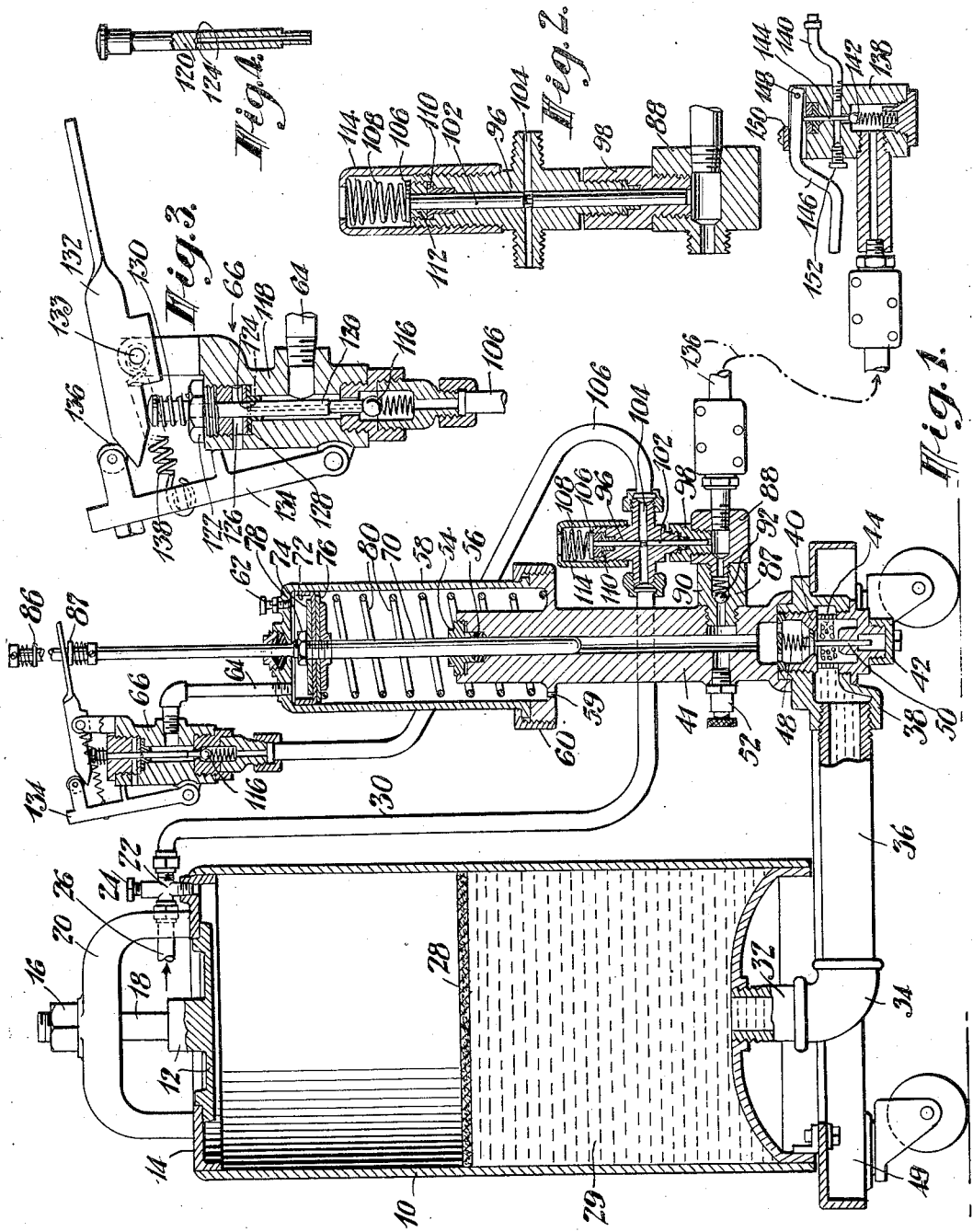
Inventor
GEORGE B. STAPLES
By his Attorney
Edmund G. Borden Patented July 2, 1935

2,007,113

UNITED STATES PATENT OFFICE 2,007,113

HIGH PRESSURE GREASING APPARATUS

George Bruce Staples, Philadelphia, Pa., assignor to Crew Levick Company, Philadelphia, Pa., a corporation of Pennsylvania Application January 26, 1931, Serial No. 511,249

2 Claims. (Cl. 221—47.1)

This invention relates to improvements in apparatus for delivering grease under high pneumatic pressures, more particularly it relates to a portable, automatic grease gun for lubricating heavy machine parts and automotive vehicles.

Some of the objects of this invention are: to provide an automatic grease gun to feed lubricants under high pressure into heavy machine parts of automotive vehicles; to provide apparatus adapted to replace the used hardened lubricant in the machine part with clean, fresh grease; to provide pneumatically operated apparatus for the quick, easy and accurate control of the quantity of grease admitted into the machine parts; to provide portable greasing apparatus which can be readily pushed about to any point where the machine part to be lubricated is situated; and to provide apparatus for delivering a continuous supply of grease under high pressure.

With these and other objects in view the invention will be best understood from the following detailed description taken in connection with the accompanying drawing, in which:

Fig. 1 is a longitudinal vertical cross-section of the apparatus hereinafter described and claimed.

Fig. 2 is an enlarged view of the pressure regulating valve shown in Fig. 1.

Fig. 3 is an enlarged view of the air operating valve shown in Fig. 1.

Fig. 4 is an enlarged view partly in section of the valve stem of the air operating valve shown in Fig. 3.

The preferred form of the invention as shown in Fig. 1, comprises a grease tank or cylinder 10 provided with a hand hole plate 12 adapted to make a tight fit with the top 14 of the tank by taking up on nut 16 screwed onto pin 18 passing through a hand hole dog 20 on top 14 of the tank. The hand hole plate 12 is partly flanged for the insertion of a gasket between the flange and top plate 14 so as to make an air tight joint.

Air is supplied to cylinder 10 through a four way connection 22 provided with a screw 24 for releasing the air pressure in the apparatus when the air supply has been shut off. The connection 22 is attached to a hose 26 connecting with a source of air supply, and an opening for passage of air into the tank 10. Air under a pressure of from 150 to 300 pounds per square inch, passes through hose 26 and connection 22 into the tank 10 and forces a grease pad 28 downward thus discharging grease 29 from the tank 10 through an outlet 32. Pad 28 fits the interior of the tank and should be well coated with grease so that when air under pressure is applied in the chamber of the tank 10, the air will not pass through it into the grease.

The tank 10 is in communication with a high pressure grease pump 41 by means of outlet pipe nipple 32, an L 34, a long pipe nipple 36, an L 38 and a foot valve unit 40 seated at the base of grease pump 41. The bottom of the valve unit 40 has a removable cap 42 which may be removed for cleaning the valve unit or for moving the valve stem. A cylindrical clip spring screen 44 comprising a part of the valve unit prevents any grit in the grease from passing through into the grease pump. A spring 48 and a slidably mounted valve stem 50 provided with a valve head permit the passage of any grease through the valve chamber into the cylinder of the grease pump 41 but prevent the flow of grease in the opposite direction. The greasing apparatus is mounted on a truck 49.

The cylinder of grease pump 41 is provided with an air release screw 52 for the purpose of releasing air when the apparatus is first put in operation. During the operation of the grease gun this screw is closed to prevent the escape of grease.

The high pressure grease cylinder connects directly with an air cylinder 58 and has a nut 54 retaining in position leather cup 56 to prevent leakage of grease from the grease cylinder into the air cylinder 58. The air cylinder 58 is fitted to the upper portion of the grease cylinder by means of a threaded flange and held in position by lock nut 60. Air cylinder 58 is provided with an air release screw 62 which is opened when the apparatus is not in operation to release the air pressure therefrom.

The high pressure grease pump includes a plunger 70 which is adapted to be vertically reciprocated in cylinders 41 and 58. In order to reciprocate the plunger by air pressure in cylinder 58, the plunger is provided in cylinder 58, with a head, comprising a cup 72 preferably of leather, two washers 74 and 76, all fixed to the plunger 70 with a nut 78. Cylinder 58 has a hole 59 to allow for the escape of air from the cylinder on the down stroke of the plunger 70. Below the cup leather 72 inside the air cylinder 58 is a heavy return spring 80 of high grade steel which drives the plunger 70 on its upward stroke during the operation of the gun. The upper end of the plunger is provided with fixed washers 86 and 87 spaced at an interval from each other.

The grease cylinder 41, opposite the air release screw 52, is connected to a grease discharge and check valve 87 comprising a front half 88 and a rear half 90. The rear half 90 is connected to the grease cylinder 41 and has a small passage leading into a compartment in which is a ball and spring valve 92 for closing the passage, thereby preventing grease from flowing back into the grease cylinder 41 on the upward stroke of the plunger 70. The front half 88 of the valve provides a discharge conduit for the grease to the part to be lubricated and also connects with a pressure control valve 96 through a nut connection 98.

The pressure regulating valve 96 is provided with a valve stem 102 having a circumferential recess at about the middle of its length (Fig. 2). The circumferential recess of stem 102 is normally in alignment with the lateral passages 104 of the valve 96. In the normal operation of the apparatus the valve stem 102 is held in the position shown in Fig. 2 by the pressure exerted by a spring 108 acting against seat 106 of valve stem 102. Valve 96 is provided with a cup leather 110 and a gland nut 112 to prevent the leakage of any air from passages 104 around the valve stem during the operation of the apparatus. A sleeve nut 114 encloses spring 108 and screws over the top of the valve 96. The sleeve nut is screwed down only sufficiently to maintain a satisfactory operating pressure. The air for operating plunger 70 in chamber 58 is conducted from connection 22 by a conduit 30, the air passages 104 in control valve 96, by a conduit 106 through an operating valve unit 66 and conduit 64 into the upper portion of chamber 58. The unit 66 has a ball and spring check valve 116, adapted to shut off the air supply to cylinder 58 when the ball is permitted to seat. Check valve 116 connects directly with valve body 118 in which is mounted a hollow valve stem 120, the movement of which is guided by nut 122.

As shown in Fig. 4 the central hole in valve stem 120 provides a passage from the lower end of the stem to its mid-portion, where the passage connects with four radial outlets 124. When the valve stem 120 is in an elevated position, outlets 124 communicate with an air exhaust passage 126. A cup leather 128 below air passage 126 in the valve body 118 prevents air in the space around valve stem 120 from escaping except through the radial outlets 124. Between the guide nut 122 and the head of valve stem 120 is a spring 130 adapted to raise the valve stem when released. Air operating valve unit 66 is operated by a trip lever 132 pivoted at 133, the lever in turn being moved from one of two positions to the other by the fixed washers 86 and 87 on plunger 70. The lever 132 is held in either of the two positions and prevented from assuming a dead center position by means of a rocker arm 134. The arm 134 is provided with a roller 136 which is held in engagement with the beveled end of the lever 132 by means of a spring 138.

The grease under high pressure delivered through valve 87 is conducted to the element to be greased by means of a flexible hose conduit 136, a grease discharge and regulating valve 138 and a metal hose conductor 140. The grease control valve 138 comprises a ball and spring check valve 142 adapted to prevent discharge of grease through outlet conductor 140 when the valve is seated, a valve pin 144 and a pivoted operating handle 146. The handle 146 is pivoted at 148 and held to a limited movement by retaining plate 150. The valve 138 is also provided with a cleanout screw 152.

Assuming that the greasing apparatus is charged with grease under pressure to and including the valve 138, that the pressure in the line 136 is from 6,000 to 10,000 pounds and that no grease is being delivered through outlet 140; the ball of the check valve 142 will be seated so as to prevent discharge of grease, the valve control stem 102 of valve 96 will be elevated so that air will be prevented from flowing through conduits 104 and 106 and valve stem 120 may be in the position shown in Fig. 3. If under these conditions the grease coupler 140 is attached to an element to be greased, the greasing apparatus is set in operation by pressing down on the lever 146 which unseats the ball of valve 142 and allows grease to flow out through the coupler 140 to the element to be greased. The release of grease through valve 138 reduces the pressure in line 136, valve 87, and grease pump 41, thereby causing spring 108 to force valve stem 102 to a seated position so that air will flow through the conduits 104 and 106. Air is delivered to the apparatus through the pipe 26 under a pressure from 150 to 300 pounds and under the conditions thus described passes through conduits 30, 104 and 106 through valve 66 and conduit 64 into air chamber 58 above the piston head attached to plunger 70.

The air under pressure delivered above the piston head on plunger 70 forces the plunger downward against the grease in the cylinder of pump 41 and forces the grease out through check valve 87 and to the element being greased. As the plunger 70 reaches the limit of its downward stroke, washer 86 engages trip lever 132 and swings the pointed end thereof above the roller 136 thereby permitting spring 130 to elevate valve stem 120. This operation permits the ball of valve 116 to be seated and thereby cuts off the air supply to the cylinder 58 and at the same time brings the openings 124 into alignment with air exhaust outlet 126 so that the air may be exhausted from chamber 58 through conduit 64, valve 66, outlets 124 and exhaust opening 126. The air in fact is forced out of chamber 58 by the action of spring 80 acting against the underside of the piston head on plunger 70.

As the plunger 70 is raised in the cylinder of pump 41, grease from cylinder 10 is forced and drawn into the cylinder of pump 41 through valve 40. As the plunger 70 reaches the limit of its upward stroke, washer 87 engages trip lever 132 and throws it into the position shown in Fig. 3, and forces the valve stem 120 to unseat the ball valve 116, thus allowing air to again flow through conduit 106 into chamber 58.

This operation is continued as long as grease is being delivered through connector 140 or until the pressure in conduit 136 becomes sufficiently high to force valve stem 102 against the pressure of spring 108 thereby closing air conduit 104 which in turn stops the pumping operation.

The line pressure existing in air supply line 26 is maintained constantly above the grease pad 28 in chamber 10 and in air supply line 30 so that all that is necessary to start up the apparatus is to connect the grease conductor 140 with the bearing to be greased and press down on hand lever 146 so as to unseat the ball of valve 142. The apparatus therefore is entirely automatic.

While the drawing shows the high pressure greasing apparatus somewhat in detail, it is nevertheless a diagrammatic showing, since the apparatus elements are not drawn to scale and no attempt has been made to represent the various parts in their proper size relation to each other. Furthermore the various representations of check valves and other specific elements of the apparatus are merely examples of such equipment, and other types may be used in their place. The metal hose connector 140 may include an ordinary bayonet connector or any type of connection for attaching the connector to the bearing to be lubricated.

Having thus described the invention in its preferred form what is claimed as new is:

1. In a high pressure greasing apparatus adapted to maintain a supply of grease at a maximum desired pressure of from 6,000 to 10,000 pounds per square inch, comprising a high pressure grease pump provided with an inlet for grease and a check valved outlet for grease at high pressure, a grease supply chamber provided with means including a conduit and a strainer therein for conducting grease from said chamber into said pump and means for positively forcing grease from said chamber through said conduit into said pump, said pump comprising a grease compression cylinder and a fluid pressure medium cylinder, a reciprocable plunger in said grease compression cylinder, a reciprocable piston in said pressure medium cylinder interconnected with said plunger, means for conducting a fluid pressure medium into said pressure medium cylinder for moving said piston, said means including a supply conduit and a valve mechanism for effecting the supply of fluid to and discharge of fluid from said pressure medium cylinder, said valve mechanism being operated by a reciprocable member interconnected with said piston, a high pressure grease discharge conduit connected to said predetermined maximum thereby preventing the grease pressure to rise above said maximum regardless of the pressure of the fluid pressure medium supplied to the pressure medium cylinder, said cut-off valve and associated mechanism also being adapted to allow pressure medium to for delivering grease at substantially said maximum pressure, the combination with said grease discharge conduit and said pressure medium supply conduit of a cut-off valve in said pressure medium supply conduit and associated mechanism connecting into said grease discharge conduit adapted to operate said cut-off valve in response to changes in grease pressure in said grease discharge conduit, whereby the supply of pressure medium is cut off when the grease pressure in said grease discharge conduit reaches a predetermined maximum and pressure medium is permitted to pass to said valve mechanism through said cut-off valve when the grease pressure drops slightly below said predetermined maximum upon the discharge of grease through said discharge valve.

2. In a high pressure greasing apparatus adapted to maintain a supply of grease at a maximum desired pressure of from 6,000 to 10,000 pounds per square inch in a grease dispensing conduit, including a high pressure grease pump provided with a check valved inlet for grease and a check valved outlet for grease at high pressure, and a grease supply chamber connected by a grease conduit with said pump and provided with means for forcing grease therefrom into said pump, said pump comprising a grease compression cylinder and a fluid pressure medium cylinder, a reciprocable plunger in said grease compression cylinder, a reciprocable piston in said pressure medium cylinder interconnected with said plunger, means for conducting a fluid pressure medium into said pressure medium cylinder for moving said piston to thereby drive said plunger into said grease compression cylinder, said means including a supply conduit and a valve mechanism for effecting the supply of fluid to and discharge of fluid from said pressure medium cylinder, said valve mechanism being operated by a reciprocable member interconnected with said piston, a high pressure grease discharge conduit connected to said grease pump outlet and provided with a discharge valve for delivering grease at a high pressure, and a cut-off valve in said pressure medium supply conduit, said cut-off valve including a movable member operable in response to changes in grease pressure in said grease discharge conduit to cut off the supply of pressure medium by being forced across said conduit when the grease pressure in said grease discharge conduit reaches a predetermined maximum and to permit the passage of pressure medium by being allowed to recede from across said conduit when the grease pressure drops slightly below said predetermined maximum upon the discharge of grease through said discharge valve, whereby a substantially constant supply of grease at approximately said maximum pressure is maintained in said grease discharge conduit regardless of variations in the pressure of the pressure medium supplied to the pressure medium cylinder.

GEORGE BRUCE STAPLES.

CERTIFICATE OF CORRECTION.

Patent No. 2,007,113.                                                                        July 2, 1935.

GEORGE BRUCE STAPLES.

It is hereby certified that error appears in the printed specification of the above numbered patent requiring correction as follows: Page 3, first column, line 34, claim 1, beginning with the word "predetermined" strike out all to and including the word "to" second occurrence in line 39, and insert instead grease pump outlet and provided with a discharge valve; same claim, lines 51-52, for the words "and pressure medium is permitted" read thereby preventing the grease pressure to rise above said maximum regardless of the pressure of the fluid pressure medium supplied to the pressure medium cylinder, said cut-off valve and associated mechanism also being adapted to allow pressure medium; and that the said Letters Patent should be read with these corrections therein that the same may conform to the record of the case in the Patent Office.

Signed and sealed this 5th day of November, A. D. 1935.

(Seal)

Leslie Frazer
                                                     Acting Commissioner of Patents.